(12) United States Patent
Boncodin

(10) Patent No.: US 7,398,740 B2
(45) Date of Patent: Jul. 15, 2008

(54) MULTI-MISSION/PURPOSE GROUND-EFFECT CRAFT DERIVED FROM A COMMON MODULAR PLATFORM

(76) Inventor: Franz B. Boncodin, 4327 Woodruff Ave., Lakewood, CA (US) 90713-2552

( * ) Notice: Subject to any disclaimer, the term of this patent is extended or adjusted under 35 U.S.C. 154(b) by 281 days.

(21) Appl. No.: 11/043,578

(22) Filed: Jan. 26, 2005

(65) Prior Publication Data

US 2006/0162638 A1 Jul. 27, 2006

(51) Int. Cl.
*B60V 1/00* (2006.01)
*B60V 1/02* (2006.01)
*B60V 1/14* (2006.01)
*B60V 3/00* (2006.01)
*B60V 3/06* (2006.01)
*B63B 1/38* (2006.01)
*B63B 3/02* (2006.01)

(52) U.S. Cl. ............... 114/67 A; 114/77 R; 114/271; 114/272; 180/116; 180/117; 180/127

(58) Field of Classification Search .............. 114/67 A, 114/67 R, 77 R, 77 A, 271, 272; 180/116–130
See application file for complete search history.

(56) References Cited

U.S. PATENT DOCUMENTS

| | | | |
|---|---|---|---|
| 3,190,582 A | 6/1965 | Lippisch | |
| 3,221,831 A | 12/1965 | Weiland | |
| 3,231,038 A | 1/1966 | Weiland | |
| 3,381,921 A * | 5/1968 | McDonough et al. | 410/79 |
| 3,730,298 A | 5/1973 | Schouw | |
| 3,746,116 A * | 7/1973 | Schwingshandl | 180/121 |
| 3,762,355 A | 10/1973 | Raynes | |
| 3,870,121 A | 3/1975 | Schneider | |
| 3,908,783 A | 9/1975 | Joerg et al. | |
| 3,917,022 A | 11/1975 | Brooks, Jr. | |
| 3,919,944 A | 11/1975 | Jorg | |
| 3,972,490 A | 8/1976 | Zimmermann et al. | |
| 4,080,922 A | 3/1978 | Brubaker | |
| 4,151,893 A | 5/1979 | Mantle | |

(Continued)

FOREIGN PATENT DOCUMENTS

RU      2149109 C1 *  5/2000

(Continued)

*Primary Examiner*—Ajay Vasudeva
(74) *Attorney, Agent, or Firm*—Stetina Brunda Garred & Brucker

(57) ABSTRACT

A multi-mission/purpose ground-effect craft is provided which is derived from a common modular platform which includes a hull; an inner floor structure adapted to be installed over the hull; a body adapted to be attached to at least one of the top surface of the hull and the inner floor structure, such that a interior compartment is formed thereinside; a tail wing assembly adapted to be attached to the aft end of the body; a forward nose cowl adapted to be attached to at least one of the forward nose portion of the hull and the forward body portion of the body; a windshield integrated into the forward end of the body; at least one door assembly integrated into the left or right body side; at least one window assembly integrated into the left or right body side; a propulsion system integrated within the aft end of the body; and a retractable skirt attached and draped from the outer or inner perimeter of the hull.

6 Claims, 13 Drawing Sheets

U.S. PATENT DOCUMENTS

| | | |
|---|---|---|
| 4,442,986 A | 4/1984 | Rousseau |
| 4,627,376 A | 12/1986 | Scarfo et al. |
| 4,757,962 A | 7/1988 | Grant |
| 5,065,833 A | 11/1991 | Matsuoka et al. |
| 5,125,470 A * | 6/1992 | Saunders ............... 180/116 |
| 5,242,132 A | 9/1993 | Wukowitz |
| 5,267,626 A * | 12/1993 | Tanfield, Jr. ............ 180/117 |
| 5,357,894 A | 10/1994 | Jacobson |
| 5,415,365 A | 5/1995 | Ratliff |
| 5,464,069 A | 11/1995 | Gifford |
| 5,636,702 A | 6/1997 | Kolacny |
| 5,697,468 A | 12/1997 | Russell, Jr. et al. |
| 5,823,468 A | 10/1998 | Bothe |
| 5,860,620 A | 1/1999 | Wainfan et al. |
| 5,950,559 A | 9/1999 | Klem |
| 6,014,940 A | 1/2000 | Jacobson |
| 6,029,929 A | 2/2000 | Blum et al. |
| 6,158,540 A | 12/2000 | Rice et al. |
| 6,164,591 A | 12/2000 | Descatha |
| 6,325,011 B1 | 12/2001 | Klem |
| 6,546,886 B2 | 4/2003 | Burg |
| 6,547,181 B1 | 4/2003 | Hoisington et al. |
| 6,561,456 B1 | 5/2003 | Devine |
| 6,581,536 B1 | 6/2003 | Belloso |
| 6,616,094 B2 | 9/2003 | Illingworth |
| 6,732,672 B2 | 5/2004 | Shin et al. |
| 2003/0066471 A1 | 4/2003 | Shin et al. |
| 2004/0050602 A1 | 3/2004 | Jones |

FOREIGN PATENT DOCUMENTS

| | | | |
|---|---|---|---|
| WO | WO 9311952 A1 * | 6/1993 | |
| WO | WO 9311986 A1 * | 6/1993 | |
| WO | WO 9954181 A2 * | 10/1999 | |

* cited by examiner

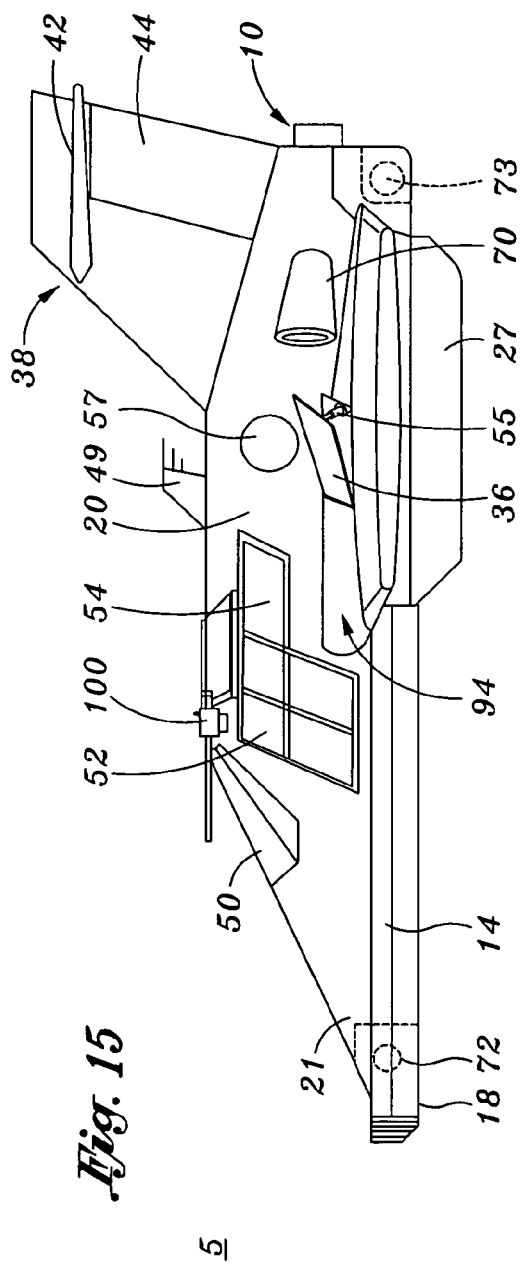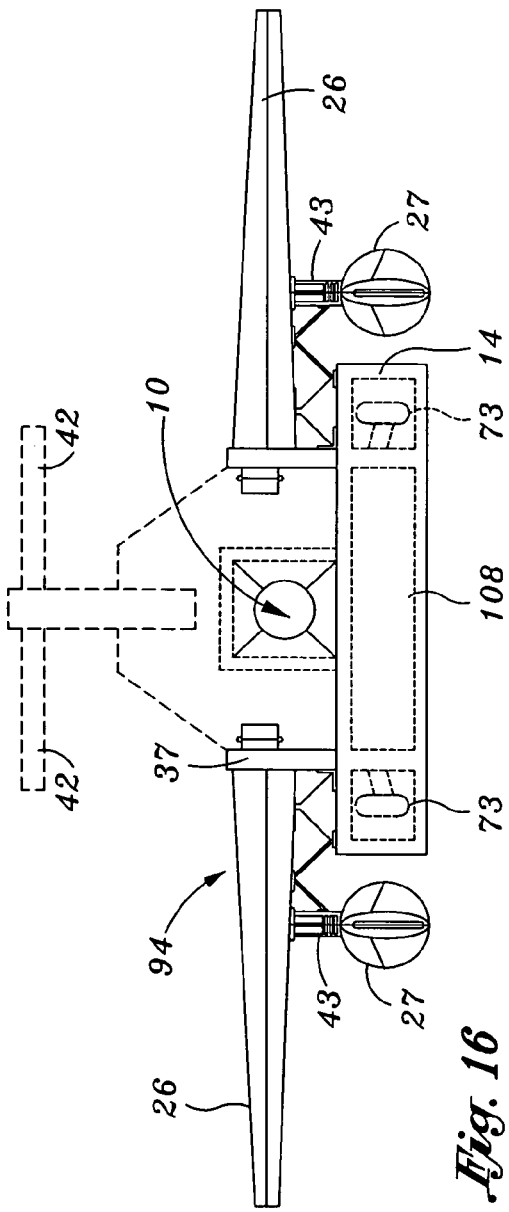

MULTI-MISSION/PURPOSE GROUND-EFFECT CRAFT DERIVED FROM A COMMON MODULAR PLATFORM

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to various multi-mission/purpose ground-effect craft derived from a common modular platform. In particular, the present invention pertains to a craft (a.k.a. HOVERJETBOAT) which is adapted to hover and fly over water, air and land. And in more particularity, the present invention pertains to a modular platform in which a plurality of different HOVERJETBOAT craft may be built using common and interchangeable components (i.e., implementing modularity concepts).

2. Background of the Invention

Ground effect vehicles such as "flying hovercrafts" and its predecessor the hydrofoil have been in development and use for decades, primarily for civilian recreational purposes.

Ground effect craft are generally composed of bodies shaped in various configurations supported by a hull of various construction materials. The craft may, or may not be equipped with lift fan assembly disposed within a somewhat vertically oriented duct, typically formed in the forward portion of the craft. The fan or propeller disposed within the duct sucks air from above the vehicle and forces it underneath the hull of the craft to induce a hovering effect between a surface (air or water) and the bottom of the hull. The inclination or angle of the lift fan relative to the centerline of the duct typically determines the ease on how the craft can elevate, rise or hover above a given surface while slightly assisting push the craft forward.

To help provide the hovering capability of the craft, typically a continuous seamless skirt of durable fabric, canvass or oil-based material is installed around the bottom edge of the craft. The skirt holds or envelops the stream of forced air from the lift fan assembly that is continually generated and pushed downwards underneath the hull of the craft. As a result, the craft is sustained above the ground on a cushion of air contained within the skirt as long as the lift fan, propeller or blade is operating.

To provide forward movement or propulsion, large vertical propeller(s) or thrust engine(s) may be installed in the aft end of the craft, on both sides of the external body, or on the wings and other locations deemed practical. For power source, most hovercrafts employ combustion engines coupled to shaft and belt systems adapted to run both the lift and the propulsion blades. A belt system is typically attached to a revolving shaft turns the front and back propellers, causing the craft to effect a hover and forward motion over a given surface. Working simultaneously, the propulsion fan or thrust engine pushes the craft forward as the lift fan continuously forces air underneath the craft, making the craft float on cushion of air as the craft's velocity starts to build up.

It is noted that some "flying" hovercraft do not really fly in the true "technical sense" such as airplanes. Rather, as the craft picks up speed, the velocity of the craft combined with lift from the craft's wings, enables the craft to start rising above the surface and commence to float and fly in a rudimentary sense. The speed and flight envelope characteristics vary depending on the sophistication of the craft. For instance, hovercraft are capable of traveling at minimal crawling speeds (near still) to high velocity speeds (over 100 mph) and fly at heights from just a few inches above the ground to 50 feet or even higher.

Through the years, the craft have seen various innovations; however, with the exception of a few practical uses, ground effect craft have not truly reached their full potential. Ground effect vehicles or hovercraft may be purchased from vendors or built from a kit, but otherwise, are not readily available or used as a mainstream mode of transportation. Thus, presently the popularity of such craft appears to be somewhat limited.

One concept that has yet to be exploited in the design, manufacture and assembly of ground effect craft is the concept of modularity. It would be ideal to provide various multi-mission/purpose ground-effect craft derived from a common modular platform. In particular, it would be beneficial to provide a modular platform in which a plurality of different craft may be built using common and interchangeable components (i.e., implementing modularity concepts). As a result, specialty craft optimized for the police and military operations could be built from a similar platform of which civilian craft were derived therefrom. Furthermore, various models with different propulsion systems could be built from the same modular platform. As a result, the price of the craft could be reduced significantly.

Ideally, a civilian version of the modular hovercraft would be useful for agricultural, industrial, light commercial, recreational and institutional uses. As an example, crop dusting could be performed effectively and efficiently by a very low-flying hovercraft versus the less-effective higher-flying propeller plane. A civilian version of the craft could be utilized for maintenance and survey of open inland waterways, oil pipelines, land and shoreline environmental monitoring. The civilian craft could even become an alternate mode of transportation. Moreover, the tourism and recreational industries could also greatly benefit from the use of a civilian hover craft derived from a modular platform.

A military version of the modular hovercraft would have varied applications such as reconnaissance, patrol, attack, search and rescue missions particularly on the sea, shorelines, large bodies of inland rivers, canals, lakes and other open bodies of land and water, including ice. For instance, a military version could be used to closely patrol, monitor or deter possible terrorist activities along U.S. coastlines or land boundaries.

Another advantage of hovercraft operation is that the operator need not obtain a pilot's license to fly the craft. The pilot only needs to have about 160 craft training hours (civilian training) to learn boat navigation, law of the sea, certain FAA regulations, operating on water, land and air, service and maintenance. Thus, the proposed modular craft could reduce training expenses currently incurred from more expensive helicopter, aircraft and boat operations.

If properly nurtured, a modular hovercraft platform could quite possibly become the next JEEP of the new millennium. Overall, by providing a line a craft with varying capabilities which can be built from a common modular platform, the hovercraft may become a more mainstream choice of vehicle used to accomplish a variety of tasks once only reserved for boats, airplanes and/or helicopters.

BRIEF SUMMARY OF THE INVENTION

According to the present invention, a multi-mission/purpose ground-effect craft is provided which is derived from a common modular platform.

In one embodiment of the present invention, the craft preferably includes a hull having a top surface and bottom surface, and a outer perimeter defined by a forward nose portion, a leftside, rightside and aft side; an inner floor structure adapted to be installed over the hull; a body having an outside surface, inside surface, forward body portion, aft body portion, left body side, right body side and roof portion, the body adapted to be attached to at least one of the top surface of the hull and the inner floor structure, such that a interior compartment is formed thereinside; a tail wing assembly adapted to be attached to the aft end of the body; a forward nose cowl adapted to be attached to at least one of the forward nose portion of the hull and the forward body portion of the body; a windshield integrated into the forward end of the body; at least one door assembly integrated into the left or right body side; at least one window assembly integrated into the left or right body side; a propulsion system integrated within the aft end of the body; and a skirt attached and draped from the outer perimeter of the hull.

According to another aspect of the present invention, the craft may optionally include a cylindrically-shaped duct with a lift fan assembly integrated therein for generating a hovering ground effect between the bottom surface of the hull, the skirt and at least one of land or a water body. The cylindrically-shaped duct is preferably formed therethrough the forward end of the craft, including the forward nose cowl and the forward nose portion of the hull, wherein the duct and a centerline thereof is oriented generally perpendicular to the hull. Additionally, a fan of the lift fan assembly is preferably inclined at an angle $\theta$ ranging from about 15 to 35 degrees from the centerline of the duct.

According to another embodiment of the present invention, the craft further comprises a left wing attached to the left body side and a right wing attached to the right body side, each wing having an upper surface, lower surface, leading edge, trailing edge, distal wing tip and inboard attachment interface side. Each wing may include at least one air brake or air spoiler comprising an actuated panel adapted to deploy upwards and/or downwards from the upper and/or lower surface of the wing to slow the craft down while in operation. Each wing may further also include a stall inducing control edge integrated into the leading edge of each wing. Additionally, each wing may also include an aileron integrated into the trailing edge of the wing for controlling the craft. Moreover, each wing may also include a hinge generally perpendicular transverse to the length of the wingspan, wherein the wing is adapted to folded in an upright position or deployed position. Also, a winglet may be disposed on the distal wing tip.

According to another aspect of the present invention, the tail wing assembly includes a rear vertical stabilizer defined by a leading edge, trailing edge, upper distal tip, left stabilizer side, right stabilizer side, and lower attachment interface side. Preferably, the rear vertical stabilizer further includes a rudder integrated into the trailing edge for controlling the craft. Additionally, the tail wing assembly may include a left and right horizontal rear stabilizer attached near the upper distal tip of the rear vertical stabilizer, each horizontal rear stabilizer defined by a leading edge, trailing edge, distal tip, and inboard attachment interface side. Moreover, each horizontal rear stabilizer may include an elevator integrated into the trailing edge for controlling the craft. Also, a winglet may disposed on the distal tip of each horizontal rear stabilizer.

According to another embodiment of the present invention, the propulsion system is a turbine-jet engine. In this embodiment, a left and right air intake are integrated into the left and right body side for directing air into the turbine-jet engine. The aforementioned embodiment may further include at least one of a generator or alternator for providing electrical power to the craft, wherein electrical power is provided to the lift fan assembly from the at least one of a generator or alternator.

In another embodiment of the present invention, the propulsion system comprises a left and right side fan assembly, wherein each side fan assembly is attached to the aft end of the craft. Each side fan assembly preferably includes a cylindrical shroud enclosing a fan that provides propulsion. The aforementioned embodiment of the craft further includes a power generation system for providing electrical power to the craft, wherein electrical power is provided to the lift fan assembly from the power generation system. In one embodiment, the power generation system comprises a power generating fuel cell, while in another embodiment, the power generation system comprises a combustion engine coupled with at least one of a generator or alternator.

In yet another embodiment of the present invention, the propulsion system comprises an aft propeller propulsion system. The aft propeller system may include an engine powerplant adapted to rotatably drive a driveshaft having a propeller attached thereto which provides propulsion. Additionally, the aforementioned system may include at least one generator or alternator coupled to the engine powerplant for providing power to the lift fan assembly. In another embodiment of the aforementioned craft, at least one battery is housed within the body of the craft for providing backup power to the lift fan assembly.

According to other aspects of the present invention, the craft may further include a pair of retractable/detachable body-mounted pontoons, one attached the left body side and another attached to the right body side of the craft.

According to another embodiment of the present invention, a detachable wing sub-assembly is provided comprising a left wing and a right wing interconnected by an interconnection member adapted to attach to at least one of the body and hull of the craft. In another embodiment of the present invention, the craft includes a plurality of floatation tubes positioned contiguously around a perimeter of the hull. Another aspect of the aspect of the present invention includes removable/attachable pontoon assemblies adapted to be attached to the lower surface of each wing.

In another embodiment of the present invention, the exterior shape of the craft is designed to have a minimized radar signature and the materials that the craft is constructed materials thereof have maximum radar absorbing characteristics. Furthermore, another aspect of the present invention may include an automatic gun attached to a forward roof portion, and/or at least one automatic gun interfaced via a turret from the interior compartment to the exterior of the craft such that the barrel of the gun may project outside the body the craft. Moreover, an automatic gun may also be positioned in other regions of the vehicle, such as from the side or rear of the craft.

Still further aspects of the present invention include a hatch disposed through the roof portion of the body. The craft also preferably has an interior bulkhead which separates the interior compartment into a cockpit and a propulsion system bay. Moreover, the cockpit of the craft includes at least one seat attached to the inner floor structure. The cockpit further includes a control panel adapted to function as a structural bulkhead interconnecting the forward body portion, the forward nose cowl, and the windshield assembly. The control panel is adapted to house flight controls, display panels, a steering yoke, an ignition switch, communications equipment and navigation equipment.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIG. 15 is a side view perspective of a fifth exemplary embodiment of a HOVERJETBOAT, configured with an aft mounted jet turbine, and removable wings with pontoons, and floatation tube assemblies, according to an aspect of the present invention;

FIG. 16 is a rear view perspective of the fifth exemplary embodiment of the HOVERJETBOAT, illustrating the removable wings with pontoons, and floatation tube assemblies;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. The preferred embodiments of the present invention will now be described with reference to accompanying drawings.

Forward Front-Lift Fan Assembly and Aft-Mounted Jet Turbine Embodiment

Figure 1:
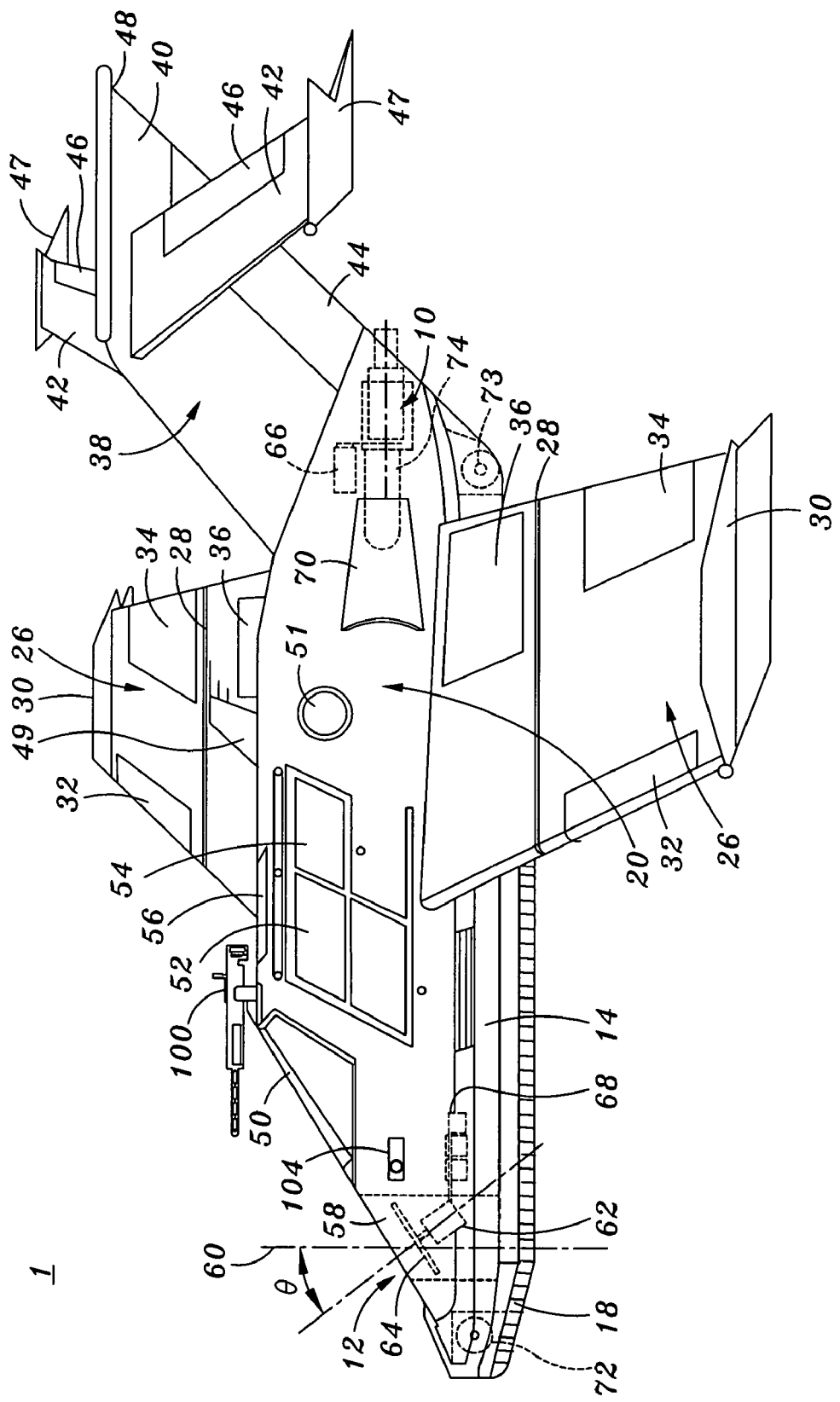
FIG. 1 is a side view perspective of a first exemplary embodiment of a HOVERJETBOAT, configured with an aft positioned jet turbine and front-lift fan assembly, according to an aspect of the present invention.
Figure 2:
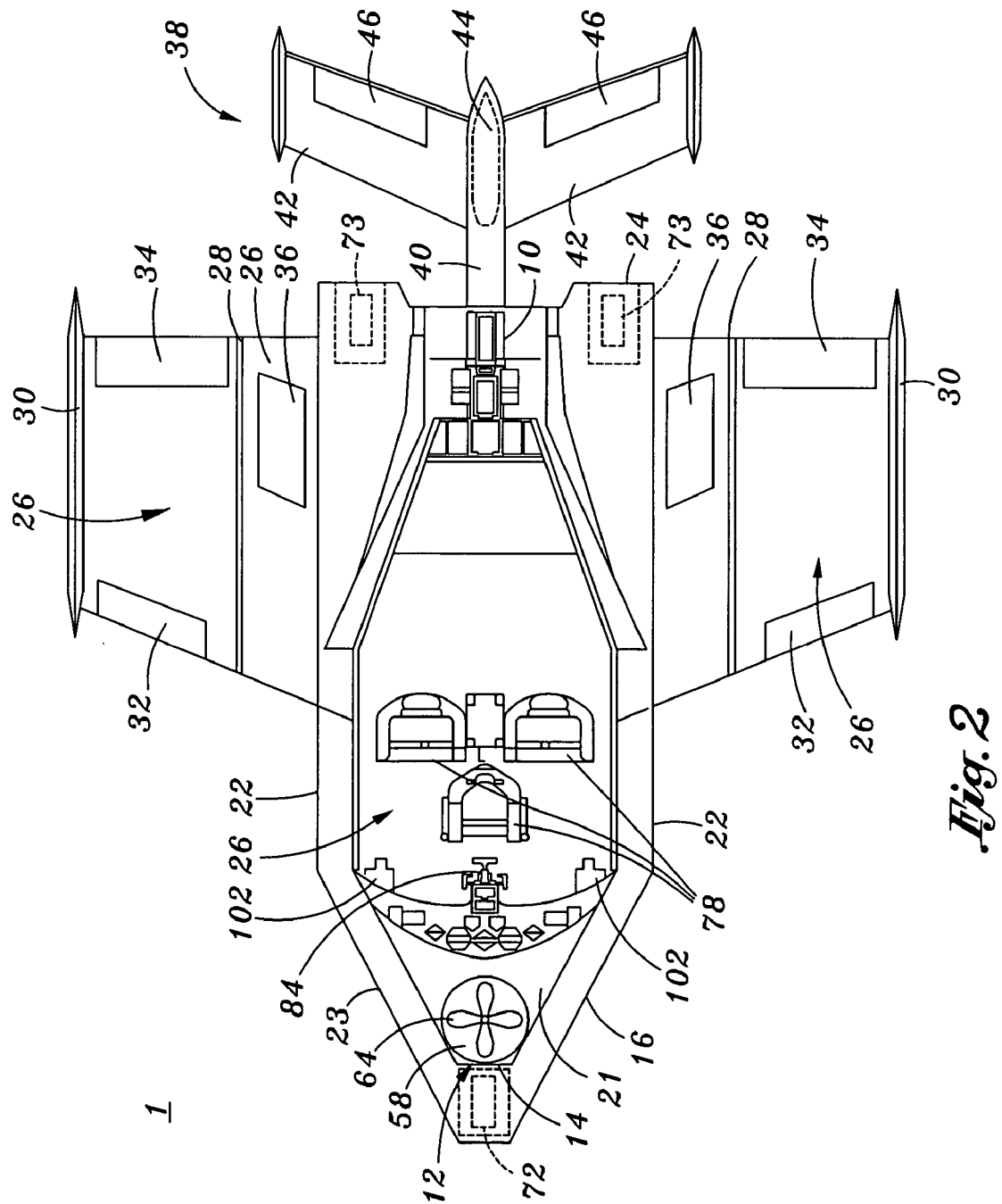
FIG. 2 is a top view of the first exemplary embodiment of the HOVERJETBOAT, according to an aspect of the present invention.
Figure 3:
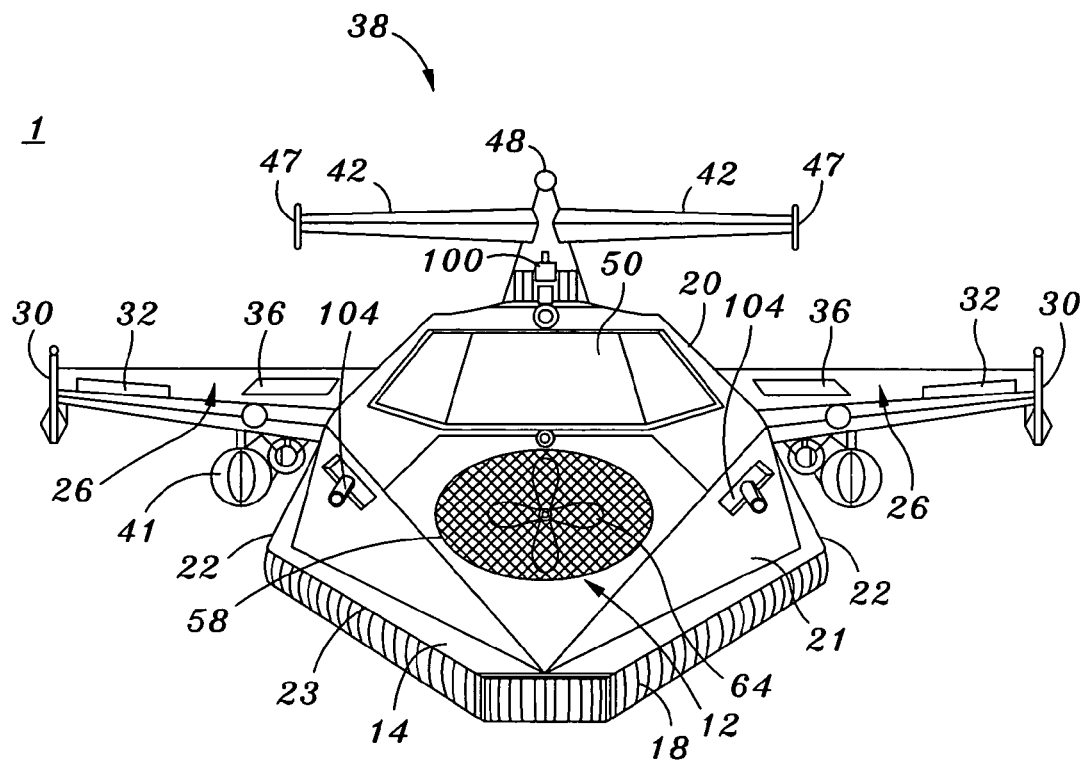
FIG. 3 is a frontal view perspective of the first exemplary embodiment of the HOVERJETBOAT, according to an aspect of the present invention.
Figure 4:
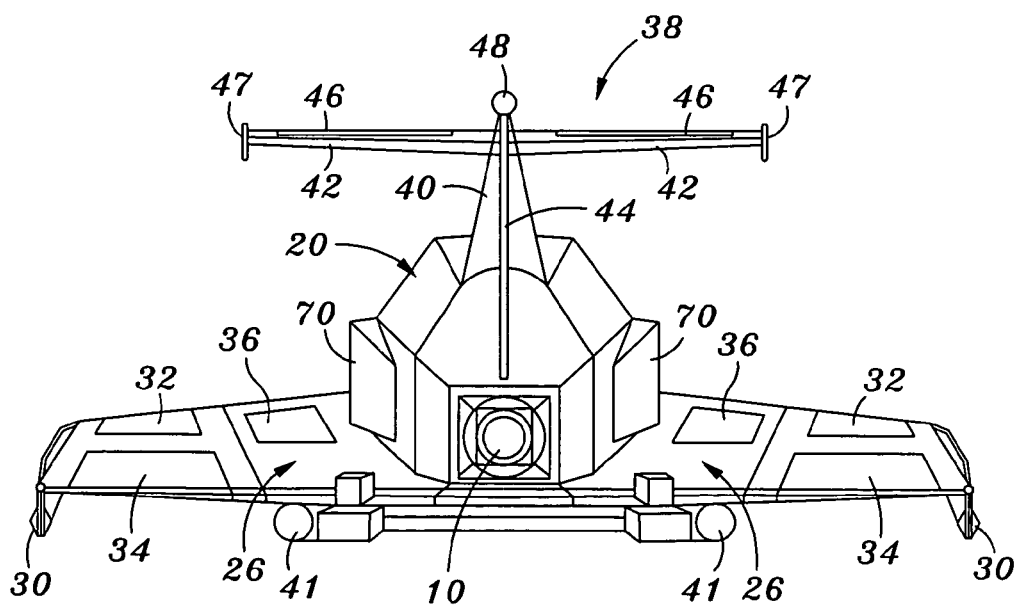
FIG. 4 is a rear view perspective of the first exemplary embodiment of the HOVERJETBOAT, according to an aspect of the present invention.

FIGS. 1-3 provide a first exemplary embodiment of a HOVERJETBOAT [hereinafter "craft 1"]. The first exemplary embodiment craft 1 is configured with a jet turbine 10 mounted in the aft of the craft 1 for main forward thrust and propulsion and a front-lift fan assembly 12 positioned in the forward of the craft 1 for inducing upward lift and hovering capabilities.

The front-lift fan assembly 12 is positioned in a cylindrically-shaped duct 58 integrated in the nose of the craft 1 such that a centerline 60 of the duct is generally in a generally upright position. The front-lift fan assembly 12 preferably includes an electric motor 62, such as a DC motor, with a fan blade 64 attached to the shaft of the motor 62. Preferably, the shaft of the motor is inclined at an angle $\theta$ ranging from about 15 to 35 degrees from the duct centerline 60. The motor 62 may be powered from electricity generated from an alternator/generator 66 which is driven as an accessory by the turbine 10. At least one battery 68 (or a bank of batteries) is provided to store electrical energy derived from the alternator/generator 66. Thus, the when the turbine 10 is not operating, the motor 62 may still be operated to rotate the front-lift fan blade if desired. Moreover, the battery(s) also provide the electrical power to start the turbine 10.

The craft 1 includes a main body 20 mounted onto a hull 14, which serves as the craft's foundation or base, to form a main fuselage of the craft. Preferably, the hull 14 and the main body have a simple design to minimize complexity a craft design, to minimize construction costs, and to provide modularity with regard to building other embodiments or variants of the HOVERJETBOAT. For instance, the hull 14 preferably is a panel having two generally parallel longitudinal perimeter sides 22, a forward v-shaped nose 23, and an aft side 24. The upper surface of the hull 14 is preferably generally flat so as to provide a base for the inner floor structure 9 (see FIG. 17). The bottom of the hull 14 (not shown) is designed to float and forge through water while at the same time also designed to provide the ground effects to allow the craft to hover. The bottom surface of the hull 14 may have a variety of shapes known in the art such as concave, flat, dual-concave, tri-hull, etc. The hull 14 may be made from a variety of materials including (but not limited to) as fiberglass, titanium, KEVLAR carbon fiber epoxy laminates, aircraft composites, wood, honeycomb composite, foam laminate composites or any other light weight high-strength material typically implemented in hydro/aero vehicle design. Additionally, the hull 14 may be surrounded by a rubberized protective bumper 16 as is best shown in FIG. 3.

To achieve the hover effect, a resilient tunic or skirt 18 is attached around the perimeter of the hull 14 and is arranged such that it drapes downward to the ground similar to that featured on most hovercraft. It is envisioned that the skirt may optionally be retractable. The skirt 18 is preferably made of a durable industrial fabric or material, such as rough service rated laminated nylon coated with neoprene, KEVLAR cloth, hybrid carbon KRVLAT material, or any durable and resilient material known in the art for manufacturing hovercraft skirts. When the front-lift fan assembly 12 is power-up, air is force-inducted underneath the hull 14 of the craft 1 and maintained under the hull 14 by the skirt 18. As a result, a cushion of air is formed which holds the craft 1 off the ground (i.e., the hovering or ground effect takes place).

The body 20 of the craft 1 is made of materials similar to that of the hull 14, including (but not limited) to fiberglass, carbon fiber epoxy laminates, aircraft composites, wood, honeycomb composite, foam laminate composites or any other light weight high strength material typically implemented in hydro/aero vehicle design. The body 20 preferably has a simple yet aerodynamic shape which may have various configurations for different embodiments or variants of the HOVERJETBOAT. It is further noted that the shape of the body 20 preferably is designed to incorporate radar reflective surfaces so as to give the HOVERJETBOAT stealth qualities. Moreover, selection of the aforementioned body materials may be made to minimize the craft's radar signature to further contribute to the craft's stealth qualities. Additionally, radar absorbent coatings may be applied onto the craft's 1 components and body surface to further enhance the HOVERJETBOAT's stealth characteristics. Furthermore, the choice of body 20 materials may include bullet proof armor type composites now currently used in a variety of military aircraft and vehicles.

As required, internally positioned space frames, bulkheads, brackets, supports, etc. may be utilized as required to for connecting the hull 14 to the body 20, as well as providing support structure for mounting various components within the craft fuselage. For instance, it is contemplated that the modular platform will utilize an interior bulkhead 41 (see FIG. 17), an aft bulkhead 39 (see FIG. 17), and a control panel bulkhead (see FIG. 5) to assist attachment of the body 20 to the hull 14 and inner floor structure 9. Furthermore, propulsion system mounting structures (not shown) will be provided in the aft or engine compartment of the craft 1 as required.

The first embodiment of the craft 1 further includes a pair of wings 26 attached the sides of the body 20, similar to that of an aircraft. The wings 26 may include various features, including wing folding hinges 28 on each wing 26 to allow the craft 1 to be more space efficiently stored. The wing folding hinges 28 may be operated to open/close by actuators/motors positioned within the wings 26 (not shown) and may also have a back-up manual drive input for manually folding the wings 26 from the deployed to non-deployed position or vice-versa.

Figure 17:
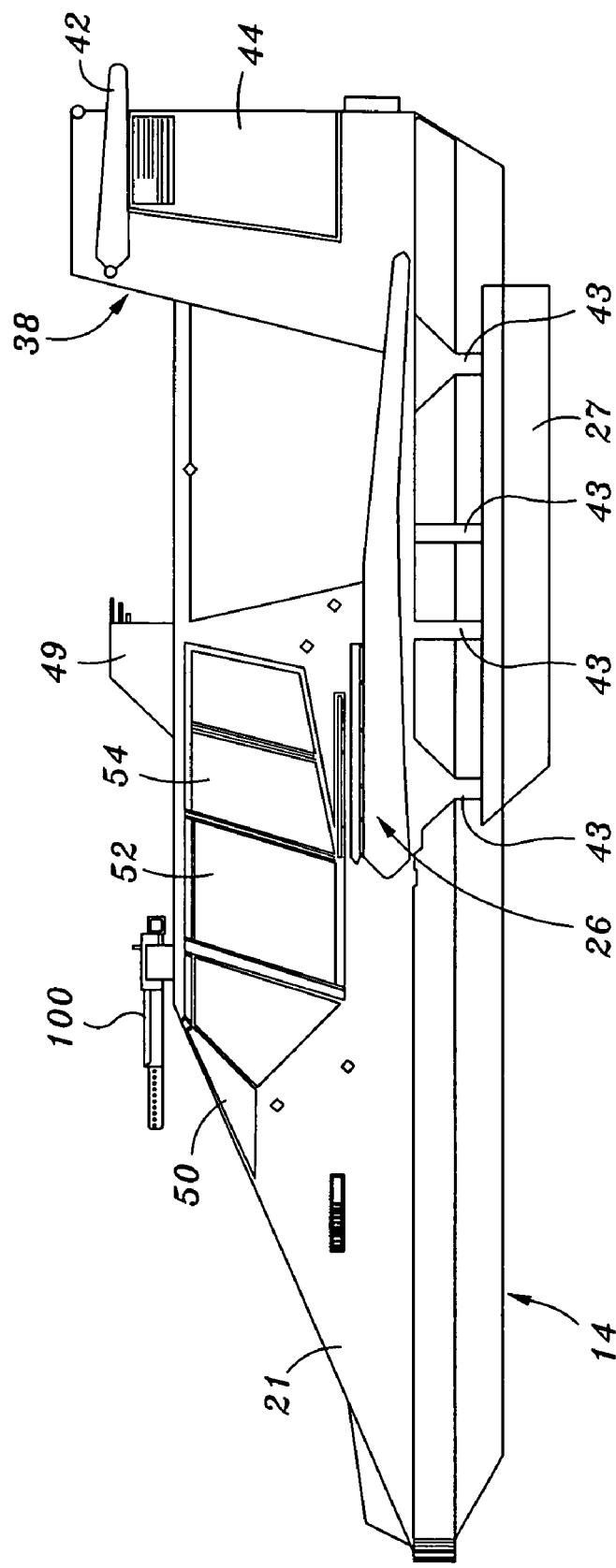
FIG. 17 is a side view of a six exemplary embodiment of the HOVERJETBOAT.

The wings 26 may include a stall inducing controlling mechanism 32 to increase the wing's lift effectivity, ailerons 19 to control flight, upper speed brakes 36 and lower speed brakes 53 to effect slowing or braking action while the craft 1 is in flight or operating on surfaces. The aforementioned features may be operated by actuators, hydraulics, or cables. An example of an actuated air brake 36 is shown in FIG. 17 (which shows an alternative embodiment of the present invention). Preferably, the wings 26 have a width and length about the equivalent to half the total length of the craft's body 20; however, it is well understood that the design of the wing may vary. The distal ends (or tips) of the wings 26 may also include winglets 30 disposed thereon.

In one embodiment, the winglets 30 may house a rubberized retractable floatation device (not shown deployed) which function as a pontoon when the craft 1 is floating on water. The retractable pontoons can be deployed to stabilize the craft and protect the wings 6 and winglets 30 while on water.

The craft 1 further includes a tail section 38 having a rear vertical stabilizer 40, rear horizontal stabilizers 42, a rudder 44 for controlling the direction of the craft, and elevators 46. Also winglets 47 may be installed on the distal ends or tips of the rear horizontal stabilizers 42. Optionally, a tail navigation/communications antenna 48 may be included in the form of a pod or appendage housing integrated to the upper edge or tip of the rear vertical stabilizer 40.

Also, near the tail section are a pair of air intakes 70, one being positioned on the leftside of the body 20 and the other on the rightside of the body 20. Each air intake 70 is connected to an air duct 74, housed within the aft or engine bay of the craft, which introduces fresh air to the jet turbine 10 through ram induction.

The first embodiment of the craft 1 further includes a other features such as a windshield 50 comprising safety glass, lexan, acrylic material or the like. The craft 1 may also be equipped with wipers (not shown) and water jets (not shown) for cleaning the windshield 50. An operable sliding or swing view door assembly 52 is preferably located on each side of the body 20 to allow the crew to ingress/egress. Additionally, a window 54 comprising safety glass, lexan, acrylic material or the like may be installed on both sides the body 20, preferably adjacent the door assembly 52. A port hole window 51 may be installed in various positions of the body 20 if desired. Moreover, positioned atop the body 20, a hatch 56 may be installed to allow access to the roof from inside the cockpit. The hatch 56 may be see-thru similar to that of a sunroof. Behind the hatch 56, a radio communication antenna 49 may also be installed on the roof of the craft 1.

If desired, the craft 1 may also include retractable emergency front landing wheel assemblies 72 and rear landing wheel assemblies 73 with brakes located the front end of the craft 1 and towards the aft end of the craft 1. Preferably, the landing wheel assemblies 72 are adapted to be retracted into the craft 1 while the craft is n operations. The landing wheel assemblies 72 may also be deployed so that the craft 1 is moveable on land. For instance, the craft 1 can be propelled by the jet turbine 10 with the landing wheel assemblies 72 deployed at low speeds such that the craft 1 moves similar to that of a land-borne vehicle. Moreover, with the landing wheel assemblies 72 deployed, and while the vehicle is powered off, the craft 1 can be moved for maintenance procedures, parking, etc. by the crew by merely pushing or towing the craft 1.

Figure 5:
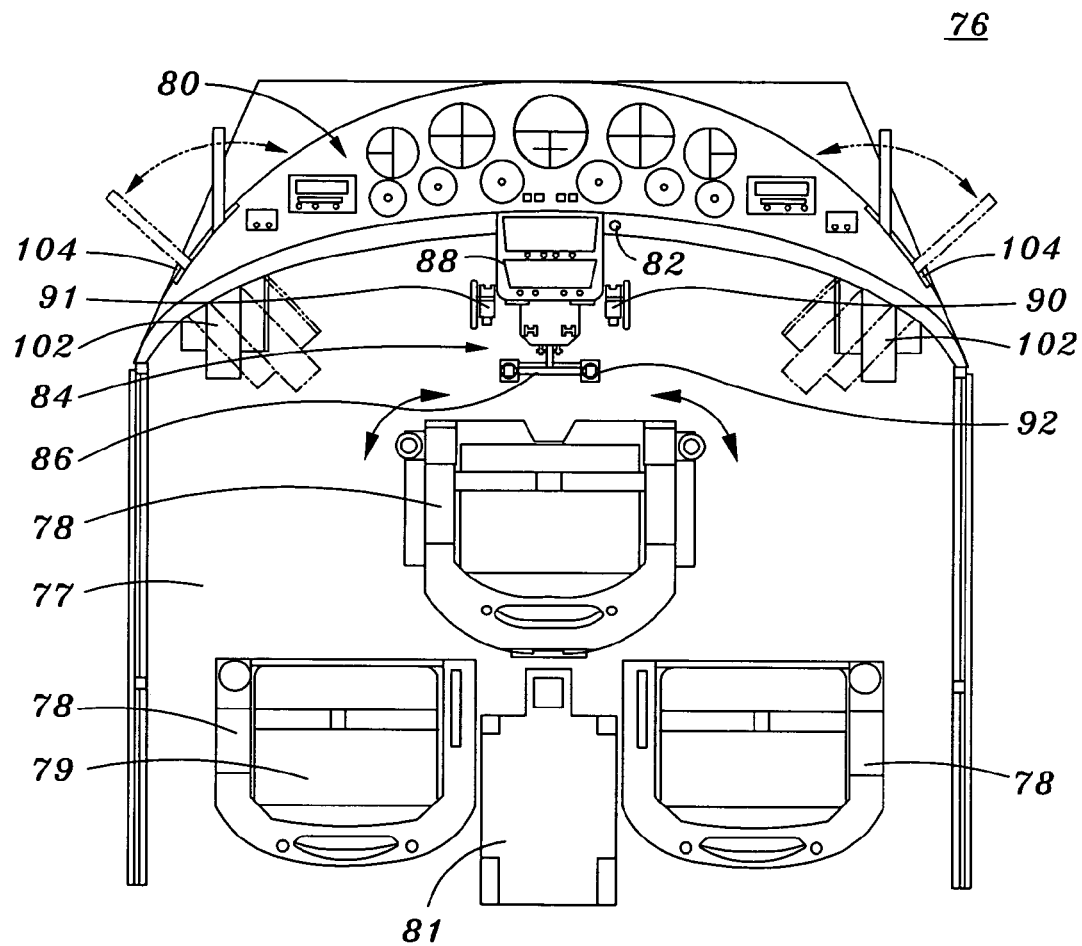
FIG. 5 is a layout plan of an exemplary cockpit of the HOVERJETBOAT, according to an aspect of the present invention.

FIG. 5 is a layout plan of an exemplary cockpit 76 of the HOVERJETBOAT, according to an aspect of the present invention. An exemplary cockpit may include a plurality of seats 78 which are adjustable, have swiveling capabilities, and have mounting brackets/latches which allow easy installation and removal from the cockpit floor 77. The cockpit floor 77 is adapted with hardware to receive the seats in various arrangements. For instance, the preferred seating arrangement is shown in FIG. 5, however, it is noted that the seats 78 may be positioned side-by-side (i.e., two or three in a row) or positioned in-line (i.e., three in a line). Similar to commercial aircraft, the seats 78 include seat cushions 79 which function as floatation safety devices and other safety features such as an emergency tracking beacon. A console 81 may be further be installed in the cockpit 76 which provides storage, while at the same time functions as a platform to stand-on if a crew member is utilizing the hatch 56.

Other features of the cockpit 76 include a control panel 80 for various gauges, instrumentation, and display screens, etc., such as an ignition switch or key mechanism 82. As noted earlier, preferably the control panel includes structural features which act as a forward bulkhead of the craft. That is to say, the structural features of the control panel 80 act as one of the modular features of the craft, providing a bulkhead which may be used to interconnect the hull 14, inner floor structure 9, forward nose cowl 21, windshield 50 an forward portion of the body 20.

Additionally, the cockpit 76 may have a steering/control yoke assembly 84 provided in the front of the control panel 80. The assembly 84 includes a steering yoke 86 and a display panel 88. The steering yoke 86 may include a lift control button 92 to control the front-lift fan assembly 12. A rightside foot pedal assembly 90 may be included for controlling the forward thrust of the propulsion system, and a leftside foot pedal assembly 91 which may be adapted to control other features of the craft 1, such as the air brake 36, rudder 44, elevators 46 and/or ailerons 34. It is further recognized that the rightside foot pedal assembly 90, leftside foot pedal assembly 91, steering yoke 86 and other instruments may be configured in a variety a manners to control the craft 1, and that the layout of the cockpit 76 and controls within the cockpit is merely exemplary.

Figure 6:
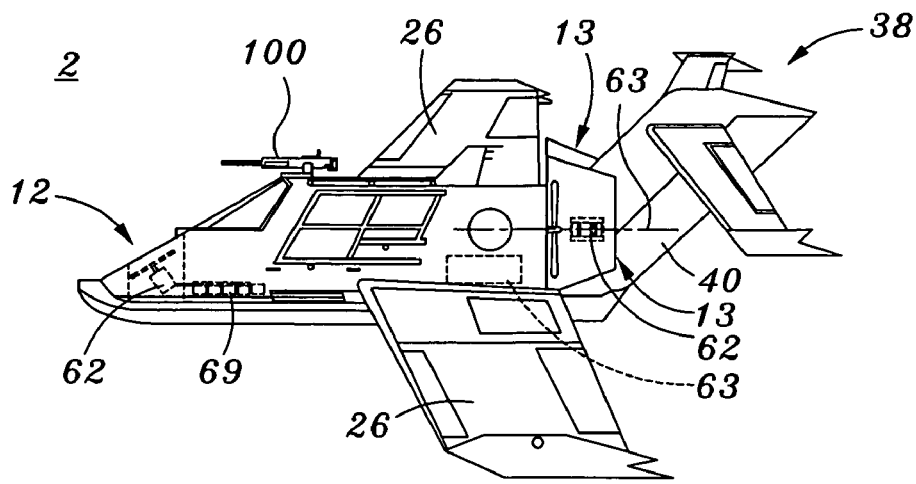
FIG. 6 is a side view perspective of a second exemplary embodiment of a HOVERJETBOAT, configured with left and right side propeller/fan assemblies and a front-lift fan assembly, according to an aspect of the present invention.
Figure 7:
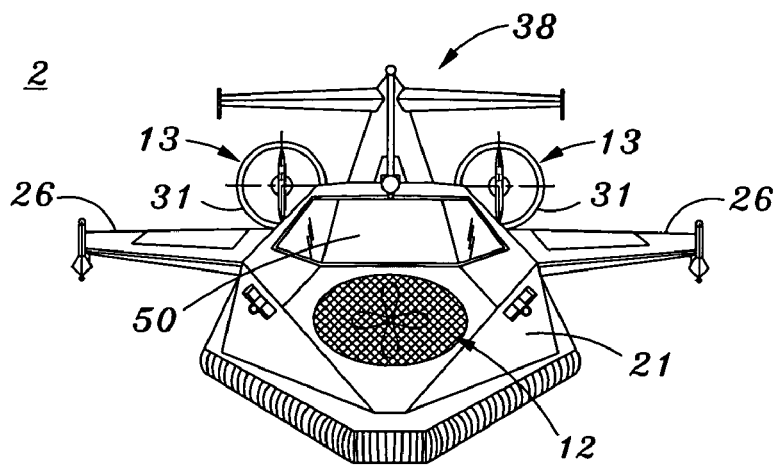
FIG. 7 is a frontal view perspective of the second exemplary embodiment of the HOVERJETBOAT, according to an aspect of the present invention.
Figure 8:
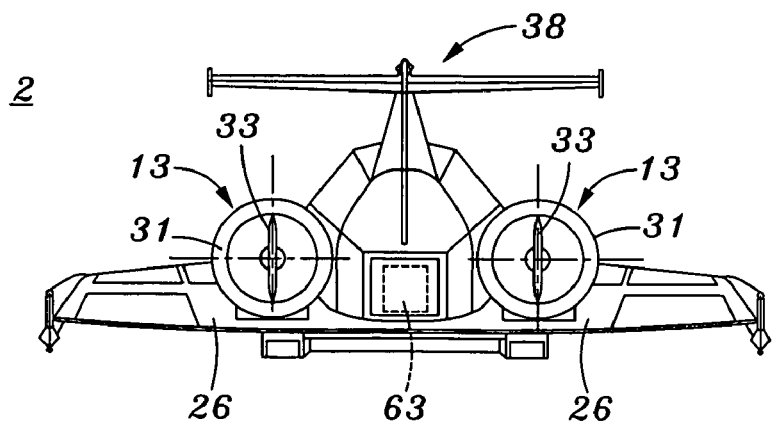
FIG. 8 is a rear view perspective of the second exemplary embodiment of the HOVERJETBOAT, according to an aspect of the present invention.
Figure 9:
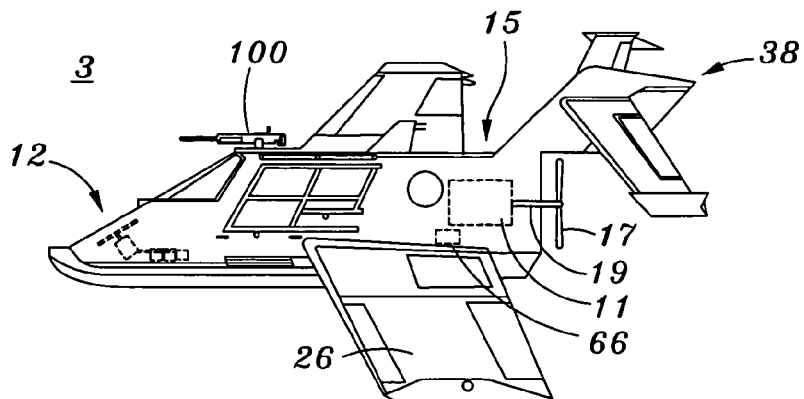
FIG. 9 is a side view perspective of a third exemplary embodiment of a HOVERJETBOAT, configured with an aft-mounted rear thrust propeller and front-lift fan assembly, according to an aspect of the present invention.
Figure 10:
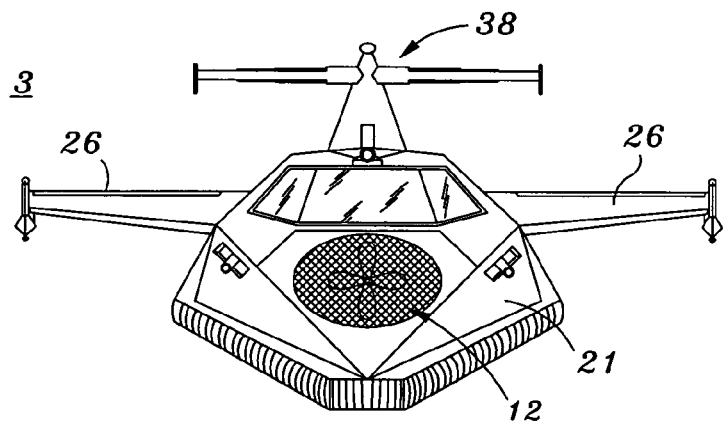
FIG. 10 is a frontal view perspective of the third exemplary embodiment of the HOVERJETBOAT, according to an aspect of the present invention.
Figure 11:
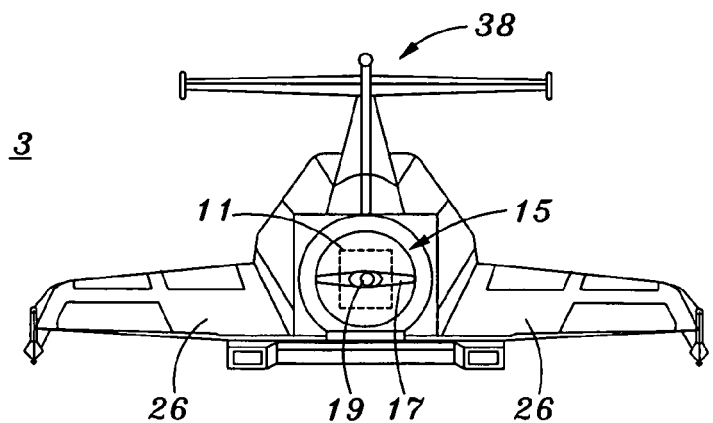
FIG. 11 is a rear view perspective of the third exemplary embodiment of the HOVERJETBOAT, according to an aspect of the present invention.

Forward Front-Lift Fan Assembly and Twin Side Fan Propulsion Assemblies Embodiment FIGS. 6-8 provide a second exemplary embodiment of a HOVERJETBOAT [hereinafter "craft 2"], configured with left and right side rear fan assemblies 13 and a front-lift fan assembly 12 positioned in the forward of the craft 1 for inducing upward lift and hovering capabilities. As mentioned, an aspect of the present invention is the ability to build numerous versions or embodiments of HOVERJETBOAT from the same modular platform. Such system reduces the design cost for each vehicle by utilizing as many of the same components or similar components. The aforementioned craft 2, is just one of many possible embodiments which may be derived from the modular platform the present invention provides.

The craft 2 preferably utilizes left and right side rear fan assemblies 13 positioned to the aft or rear of the craft 1. Each rear fan assembly 13 includes a pair of cylindrically-shaped fairings/ducts 31 attached to the aft of the craft body 20 proximately in front of the vertical rear stabilizer 40, one to the leftside of the body 20 and the other to the rightside of the body 20, such that a centerline 61 of the fairing/duct 31 is generally parallel and lateral thereto the body 20 of the craft 2. Each side fan propulsion system 13 preferably includes an electric motor 62, such as a DC motor, with a fan blade or propeller 33 attached to the shaft of the motor 62. The motor 62 may be powered from electricity generated from power generation system 63 enclosed in the aft of the craft 2, such as an internal combustion engine, electricity generating fuel cell, or turbine. The electricity that is generated is then distributed to the front-lift fan assembly 12 and both the left and right side fan propulsion assemblies 13. Furthermore, a bank of batteries 69 may be stored within the craft 2 to provide a backup source of electricity to power the vehicle at minimum hover heights and reduced speeds.

In the alternative, the fan blade or propeller 33 may be driven from belts and pulleys (not illustrated) driven from the power generation system 63. In this alternative power generation embodiment, belts may be driven off, for instance an internal combustion engine. The belts may be connected not only the rear fan assemblies 13, but also to the forward front-fan assembly 12.

Forward Front-Lift Fan Assembly and Aft-Mounted Rear Propeller Embodiment

FIGS. 9-12 provide a third exemplary embodiment of a HOVERJETBOAT [hereinafter "craft 3"], configured with an aft/rear propeller propulsion system 15 and a front-lift fan assembly 12 positioned in the forward of the craft 1 for inducing upward lift and hovering capabilities. The craft 3 preferably utilizes an aft/rear propeller propulsion system 15 which comprises an internal combustion engine 11 which drives a propeller 17 via a driveshaft 19. As mentioned, one aspect of the present invention is the ability to build numerous versions or embodiments of HOVERJETBOAT from the same modular platform. The aforementioned craft 3, is therefore, just one of many possible embodiments which may be derived from the modular platform the present invention provides.

It is further contemplated that, in another alternative embodiment of the craft 3, the engine 11 may also be configured to drive the front-lift fan blade 64 through a series of belts, pulleys and/or drive shafts (not shown). Thus, the front-lift fan blade 64 may be synchronized with the rotation of the rear propulsion propeller 17.

Forward Front-Lift Fan Assembly, Aft-Mounted Jet Turbine w/Pontoons Embodiment

Figure 12:
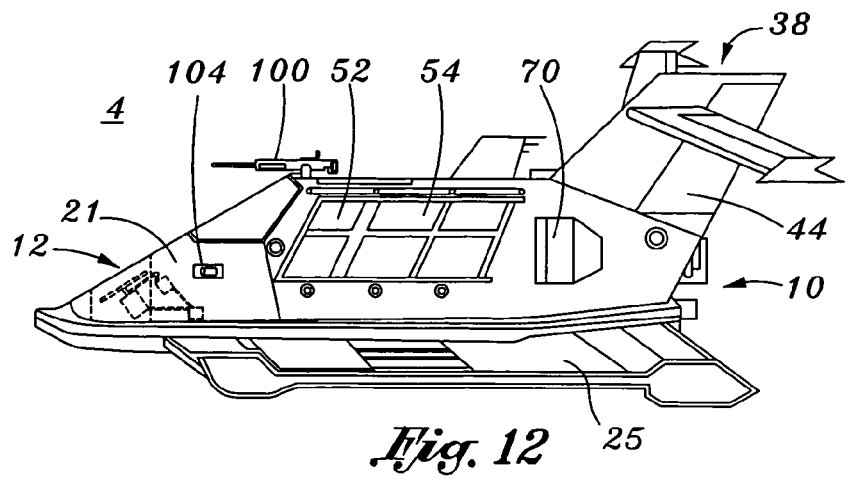
FIG. 12 is a side view perspective of a fourth exemplary embodiment of a no-flying HOVERJETBOAT, configured with an aft mounted jet turbine, front-lift fan assembly, and body side mounted pontoons, according to an aspect of the present invention.
Figure 13:
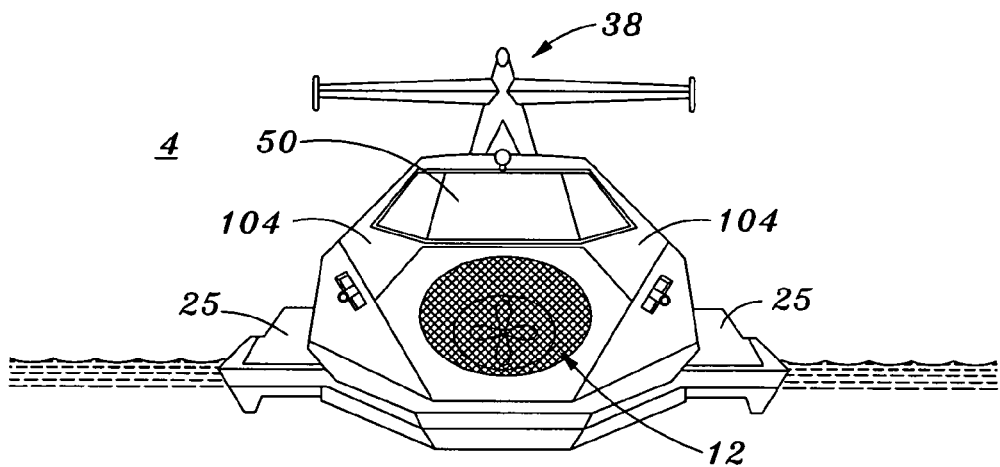
FIG. 13 is a frontal view perspective of the third exemplary embodiment of the HOVERJETBOAT, according to an aspect of the present invention.
Figure 14:
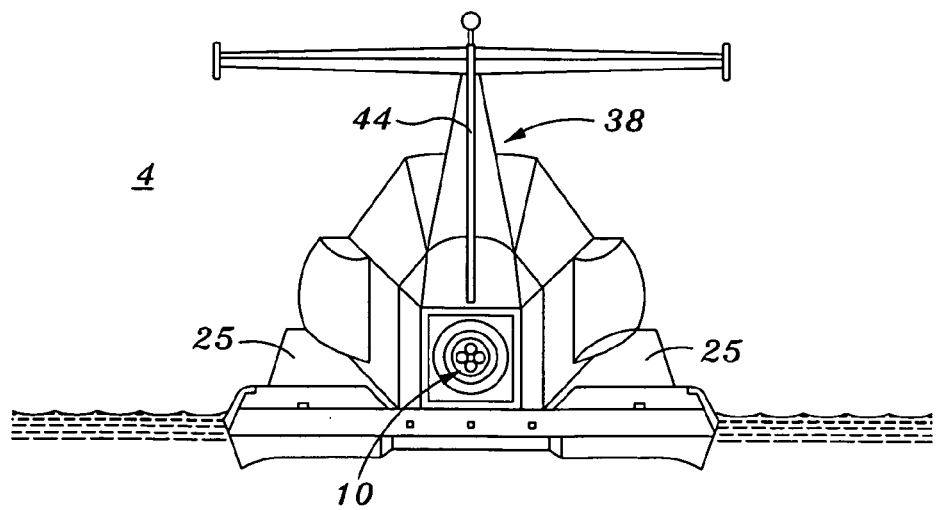
FIG. 14 is a rear view perspective of the third exemplary embodiment of the HOVERJETBOAT, according to an aspect of the present invention.

FIGS. 12-14 provide a fourth exemplary embodiment of a HOVERJETBOAT [hereinafter "craft 4"], configured with an aft-mounted jet turbine 10 and a front-lift fan assembly 12 positioned in the forward of the craft 1 for inducing upward lift and hovering capabilities. Other unique features of the craft 4 is the removal of the wings 26 utilized in the previous embodiments (Embodiments 1-3) and the installation of left and right side body mounted pontoon assemblies 25. Thus, it is shown that the present invention may be adapted to as a hovercraft adapted to function primarily as a wingless watercraft which utilizes the pontoon assemblies 25 for stabilization at high speeds.

Aft-Mounted Jet Turbine and Removable Wings and Pontoons Embodiment

FIGS. 15 and 16 is a side view and rear view perspective of a fifth exemplary embodiment of a HOVERJETBOAT, configured with an aft mounted jet turbine 10, a detachable and removable wing sub-assembly 94 with pontoons 27, and floatation tubes 29 installed underneath the hull 14, according to an aspect of the present invention. This embodiment further emphasizes the overall modular concept behind the present invention. In particular, the fifth embodiment is configured to operate without wings 26 or the front-lift fan assembly 12. Thus, it is preferable that the jet turbine 10 be utilized for propulsion; however, the other propulsion variants may also be utilized (aft propeller propulsion system 15 or side fan propulsion system 13). Like the other embodiments of the craft, floatation tubes 29 may be installed underneath the hull 14, instead of using the forward front-lift fan assembly 12.

Other features shown on the fifth embodiment, such as the air brake 36, rudder 45, and floatation tubes 29 may also be installed on the previous embodiments of the present invention. The manner in which the air brake 36 operates is illustrated in FIG. 15. The air brake 36 is a general rectangular panel, which conforms to the upper surface (or lower surface) of the wing 26, which is adapted to be actuated upwards (or downwards) from the upper (or lower) wing surface. More details with regard to the upper air brake 36 and lower air brake 53 are provided later in the specification (see FIGS. 21-24).

FIG. 17 is a side view of a six exemplary embodiment of the HOVERJETBOAT. This embodiment features a shortened body. It further includes wing-mounted pontoons 27. The preferred propulsion system may be either a jet turbine, hybrid DC motors, or dual fan propulsion systems.

An Exemplary Modularity Platform

As already discussed, an important aspect of the present invention is its modular platform. In particular, present invention allows the aforementioned various embodiments, which result in multi-mission/purpose ground-effect craft, to be derived from a common modular platform. The modular platform concept will thus allow the craft to use the same or even share components between each embodiment. As a result, numerous configuration of the HOVERJETBOAT will be able to be derived without the need to redesign the entire craft.

Figure 18:
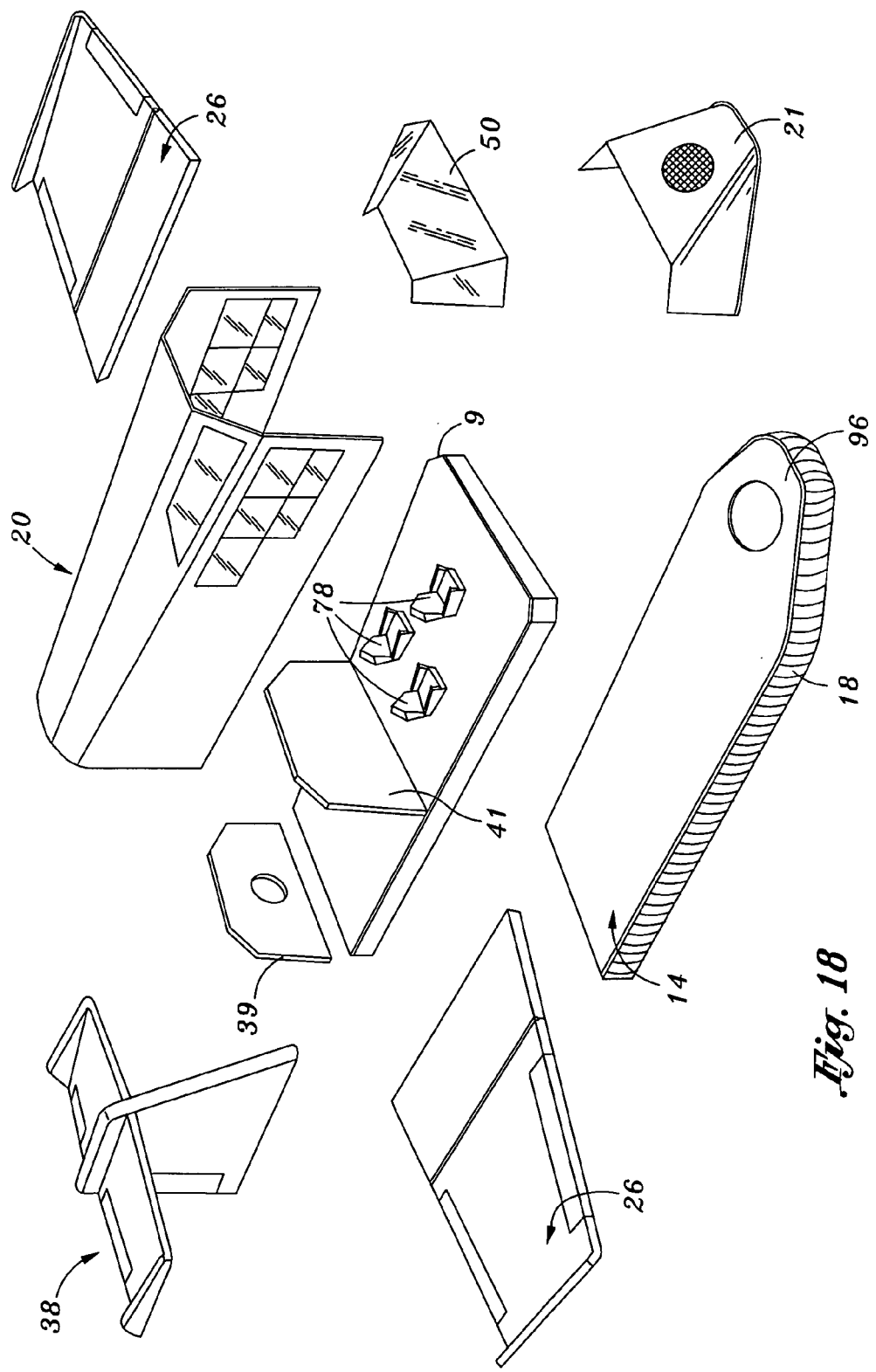
FIG. 18 is an exploded view of the components of an exemplary HOVERJETBOAT derived from a modular platform, according to an aspect of the present invention.

FIG. 18 is an exploded view of some the components of an exemplary HOVERJETBOAT derived from a modular platform, according to an aspect of the present invention. The modular platform may comprise, but is not necessarily limited thereto, a body 20, a pair of optional wings 26, the hull 14, a skirt 18 attached to the hull 14, a forward nose cowl 21, windshield 50, an inner floor structure 9, interior bulkhead 41, aft bulkhead 39 and tail section 38. By utilizing most of the aforementioned components in all the embodiments of the crafts, the modularity of the HOVERJETBOAT should allow various different vehicles to be built from the same basic components which should simplify design, help reduce engineering and manufacturing costs, allow for easy reconfigurations, etc.

Exemplary Inner Structural Members

Figure 19:
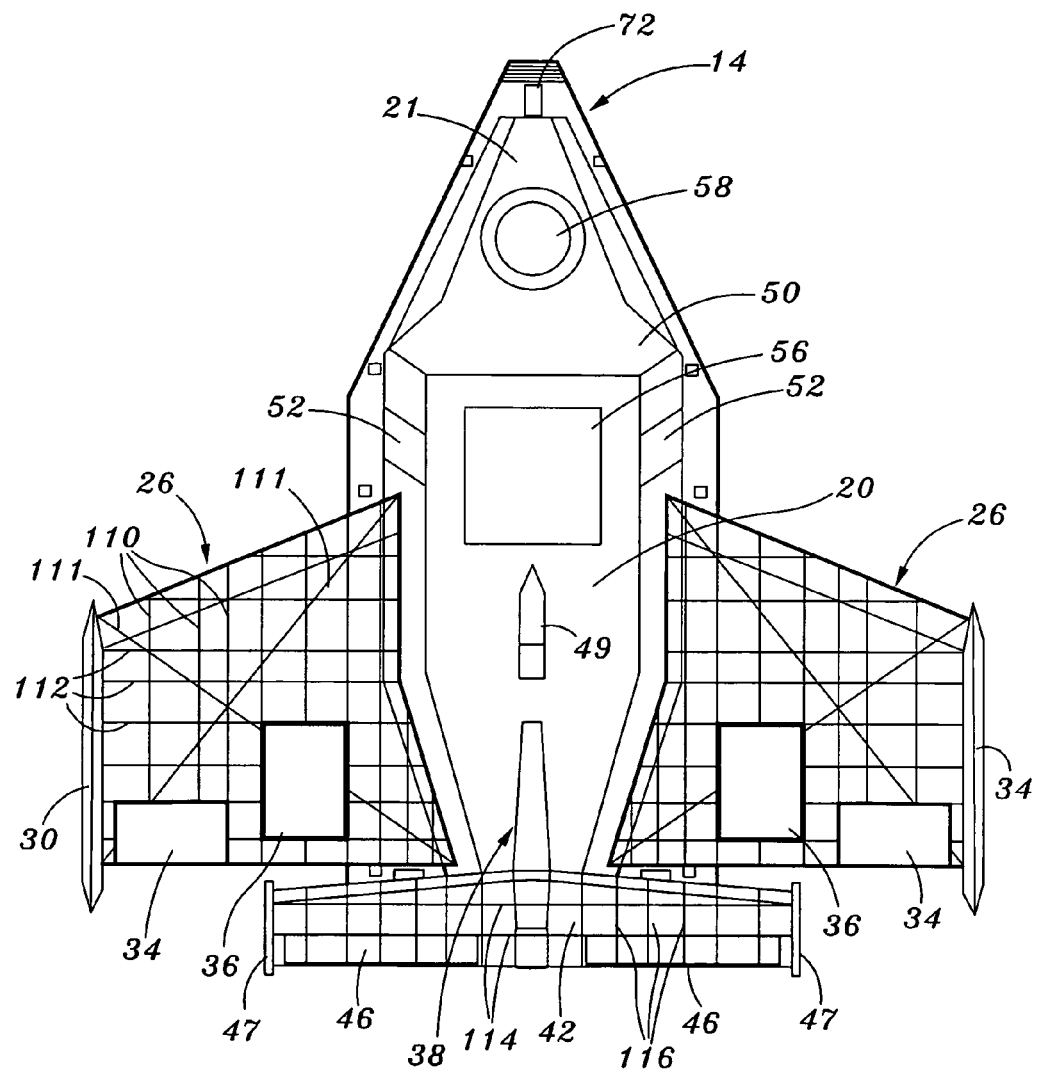
FIG. 19 is a top view of an exemplary HOVERJETBOAT illustrating an exemplary arrangement of inner structural members, according to an aspect of the present invention.

FIG. 19 is a top view of an exemplary HOVERJETBOAT illustrating an exemplary arrangement of inner structural members, according to an aspect of the present invention. In particular, for the wings 26 various wings ribs 110, wings spars 112, and diagonal cross members 111 are arranged in an exemplary intersecting pattern to provide structural rigidity. Similarly, for the horizontal stabilizer 42 and elevators 46, various wings ribs 114 and wings spars 116 are arranged in an exemplary intersecting pattern to provide structural rigidity.

Figure 20:
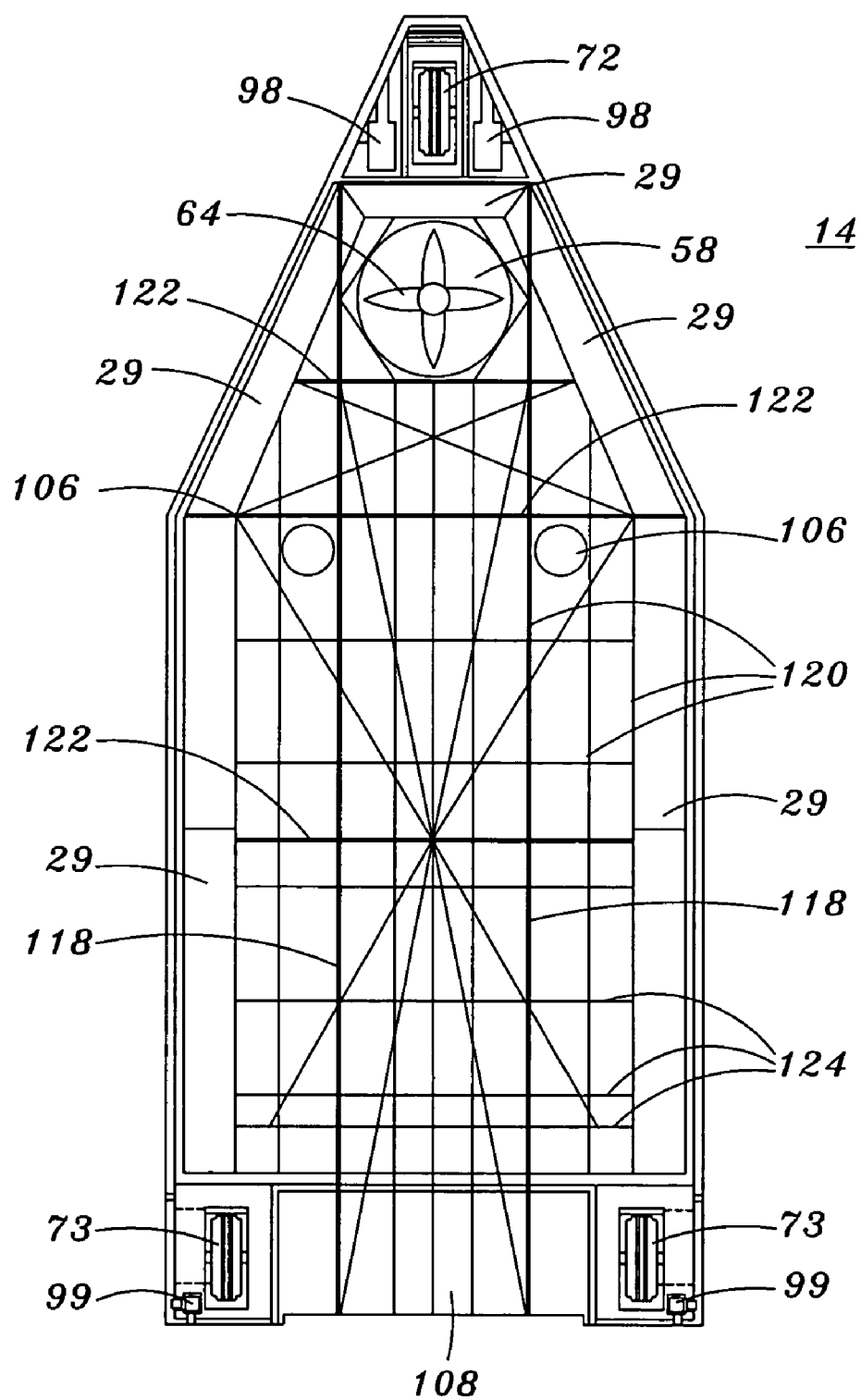
FIG. 20 is a top view of an exemplary HOVERJETBOAT of a hull illustrating an exemplary arrangement of inner structural members, according to an aspect of the present invention.
Figure 21:
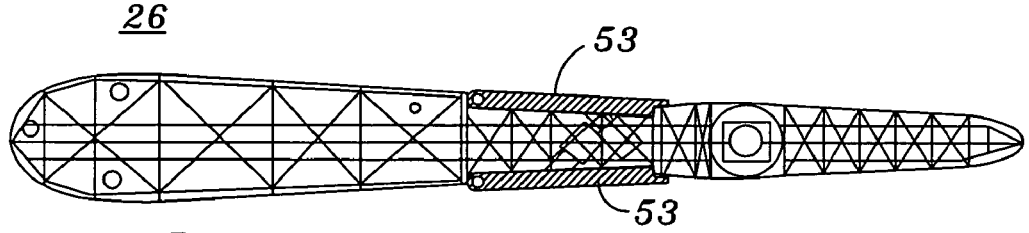
FIGS. 21 through 24 is a cross-section of a wing of an exemplary HOVERJETBOAT illustrating an exemplary arrangement of inner structural members and the speed brakes, according to an aspect of the present invention.
Figure 22:
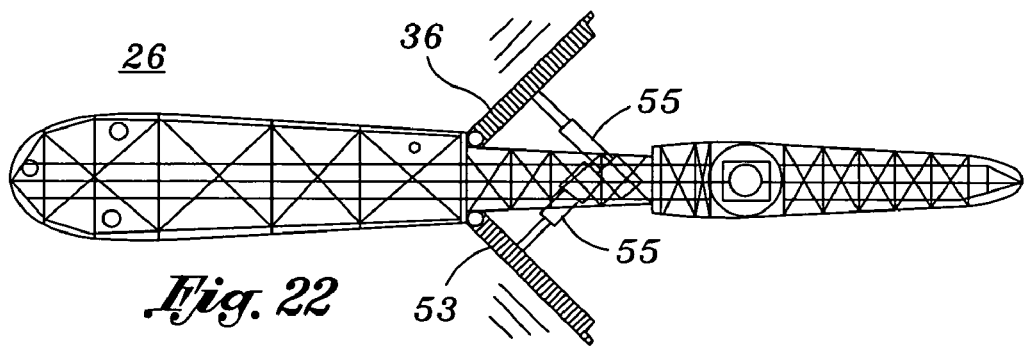
Figure 23:
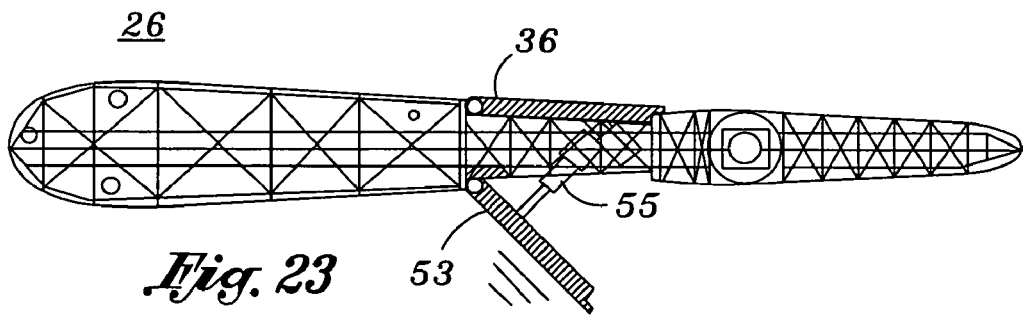
Figure 24:
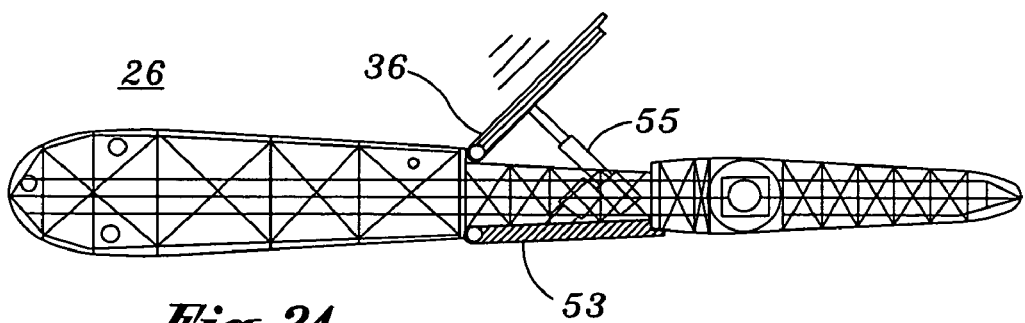

FIG. 20 is a top view of an exemplary HOVERJETBOAT of a hull 141 illustrating an exemplary arrangement of inner structural members, according to an aspect of the present invention. In particular, primary ribs 122 intersect primary spars 118 are arranged in an exemplary intersecting in a perpendicular orientation pattern to provide structural rigidity. Additionally, secondary ribs 120 intersect primary spars 124 are arranged in an exemplary intersecting in a perpendicular orientation pattern to further provide additional structural rigidity.

FIG. 20 further illustrates other various features which may be utilized in the various embodiments of the HOVERJETBOAT. For instance, a fuel tank 108 may be integrated into the rearend portion. For the military version of the craft, preferably a bullet proof shield or safety barrier surrounds the fuel tank 108. Additionally, a plurality of floatation tubes 29 may be integrated around the perimeter of the hull 14. Furthermore, water jets 98 may be integrated into the forward end of the hull 14 and bi-directional water jets 99 may be integrated into the rear corners of the hull 14 for controlling the craft in water.

FIGS. 21 through 24 is a cross-section of a wing of an exemplary HOVERJETBOAT illustrating an exemplary arrangement of inner structural members and the speed brakes 36, 53, according to an aspect of the present invention. As shown in the Figures, an upper speed brake 36 may be integrated into the upper surface of the wing 26, and a lower speed brake 53 may be integrated into the lower surface of the wing 26. Actuators 55 are utilized to extend the speed brake 36, 53 from a non-deployed position to a deployed position as shown in the Figures.

Military, Police Enforcement and Counter-Terrorism Features

Another aspect of the HOVERJETBOAT is that it may be utilized for military, police enforcement, and counter-terrorism purposes. Not only is the HOVERJETBOAT adapted to have stealth qualities and light weight armor if desired, but the HOVERJET BOAT may also become a mobile weapons platform. The HOVERJETBOAT is designed such that it may be configured with various arrangements of weapons. Most noticeable is the roof-mounted large caliber machine gun 100, preferably 50-caliber, as is best illustrated in FIG. 1. The hatch 56 is positioned the behind the roof-mounted large caliber machine gun 100 such that a crew member may stand on the console 81 inside the cockpit 76, with the hatch 56 opened, and positioned himself/herself such that he/she may operate the roof-mounted machine gun 100 with the gunner's torso being positioned standing up partially inside and outside of the cockpit 76. Another weapon arrangement includes a pair of smaller lighter-duty turret mounted automatic weapons, preferably 30-caliber, mounted and enclosed internally in the cockpit. 76 to the leftside and rightside of the craft body 20. Preferably, the gun barrels may be retracted in/out of gun barrel ports 104 which allow the gun barrels to move from side to side and up at down. It is further recognized that the gun may be placed in other positions on the vehicle such as from the side or rear of the body 20.

Other Aspects of the Present Invention

One overall aspect of the present invention, is that the HOVERJETBOAT does not necessarily have to have the front-lift fan assembly 12 (i.e., the front-lift fan assembly is optional). Furthermore, optionally-configured floatation tubes 29 (see FIG. 16) may be installed underneath the hull 14 of the craft if the craft is not utilizing the front-lift fan assembly 12. The floatation tubes 29 preferably are positioned laterally next to each other, such that the length of the tube 29 is positioned along the longitudinal length of the hull 14.

Additionally, it is recognized that various avionic, guidance, communications, data devices, amenities, etc., features may be installed and/or integrated into HOVERJETBOAT. For instance, the craft may include various external day/night light devices for path illumination; discreet front, side and back infra-red high-powered telescoping surveillance cameras attached to internal monitors; recording devices in the cockpit area; and depth sensors.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and such uses are within the scope of the appended claims.

What is claimed is:

1. A multi-mission/purpose ground-effect craft derived from a common modular platform, the craft having a body with a forward end and aft end, the craft comprising:
    a hull having a top surface and bottom surface, and an outer perimeter defined by a forward nose portion, a leftside, rightside and aft side;
    an inner floor structure adapted to be installed over the hull;
    a body having an outside surface, inside surface, forward body portion, aft body portion, left body side, right body side and roof portion, the body adapted to be attached to at least one of the top surface of the hull and the inner floor structure, such that a interior compartment is formed thereinside;
    a tail wing assembly adapted to be attached to the aft end of the body;
    a forward nose cowl adapted to be attached to at least one of the forward nose portion of the hull and the forward body portion of the body;
    a windshield integrated into the forward end of the body;
    at least one door assembly integrated into the left or right body side;
    at least one window assembly integrated into the left or right body side;
    a propulsion system integrated within the aft end of the body; and
    a skirt attached and draped from the outer perimeter of the hull;
    a cylindrically-shaped duct with a lift fan assembly integrated therein for generating a hovering ground effect between the bottom surface of the hull, the skirt and at least one of land or a water body; and a left wing attached to the left body side and a right wing attached to the right body side, each wing having an upper surface, lower surface, leading edge, trailing edge, distal wing tip and inboard attachment interface side, each wing further including a hinge generally perpendicular transverse to the length of the wingspan, wherein the wing is adapted to folded in an upright position or deployed position.

2. A multi-mission/purpose ground-effect craft derived from a common modular platform, the craft having a body with a forward end and aft end, the craft comprising:
    a hull having a top surface and bottom surface, and an outer perimeter defined by a forward nose portion, a leftside, rightside and aft side;
    an inner floor structure adapted to be installed over the hull;
    a body having an outside surface, inside surface, forward body portion, aft body portion, left body side, right body side and roof portion, the body adapted to be attached to at least one of the top surface of the hull and the inner floor structure, such that a interior compartment is formed thereinside;
    a tail wing assembly adapted to be attached to the aft end of the body;
    a forward nose cowl adapted to be attached to at least one of the forward nose portion of the hull and the forward body portion of the body;
    a windshield integrated into the forward end of the body;
    at least one door assembly integrated into the left or right body side;
    at least one window assembly integrated into the left or right body side;
    a propulsion system integrated within the aft end of the body; and
    a skirt attached and draped from the outer perimeter of the hull;
    a cylindrically-shaped duct with a lift fan assembly integrated therein for generating a hovering ground effect between the bottom surface of the hull, the skirt and at least one of land or a water body; and a power generation system for providing electrical power to the craft, the electrical power being provided to the lift fan assembly from the power generation system, wherein the power generation system comprises a power generating fuel cell.

3. A multi-mission/purpose ground-effect craft derived from a common modular platform, the craft having a body with a forward end and aft end, the craft comprising:
    a hull having a top surface and bottom surface, and an outer perimeter defined by a forward nose portion, a leftside, rightside and aft side;
    an inner floor structure adapted to be installed over the hull;
    a body having an outside surface, inside surface, forward body portion, aft body portion, left body side, right body side and roof portion, the body adapted to be attached to at least one of the top surface of the hull and the inner floor structure, such that a interior compartment is formed thereinside;
    a tail wing assembly adapted to be attached to the aft end of the body;
    a forward nose cowl adapted to be attached to at least one of the forward nose portion of the hull and the forward body portion of the body;
    a windshield integrated into the forward end of the body;
    at least one door assembly integrated into the left or right body side;
    at least one window assembly integrated into the left or right body side;
    a propulsion system integrated within the aft end of the body; and
    a skirt attached and draped from the outer perimeter of the hull; and an automatic gun attached to a forward roof portion.

4. The craft of claim 3, further comprising a control panel having at least one of flight controls, display panel, steering yoke, ignition switch, communications equipment and navigation equipment.

5. A multi-mission/purpose ground-effect craft derived from a common modular platform, the craft having a body with a forward end and aft end, the craft comprising:

a hull having a top surface and bottom surface, and an outer perimeter defined by a forward nose portion, a leftside, rightside and aft side;

an inner floor structure adapted to be installed over the hull;

a body having an outside surface, inside surface, forward body portion, aft body portion, left body side, right body side and roof portion, the body adapted to be attached to at least one of the top surface of the hull and the inner floor structure, such that a interior compartment is formed thereinside;

a tail wing assembly adapted to be attached to the aft end of the body;

a forward nose cowl adapted to be attached to at least one of the forward nose portion of the hull and the forward body portion of the body;

a windshield integrated into the forward end of the body;

at least one door assembly integrated into the left or right body side;

at least one window assembly integrated into the left or right body side;

a propulsion system integrated within the aft end of the body; and a skirt attached and draped from the outer perimeter of the hull; and at least one automatic gun interfaced via a turret from the interior compartment to the exterior of the craft.

6. A multi-mission/purpose ground-effect craft derived from a common modular platform, the craft having a body with a forward end and aft end, the craft comprising:

a hull having a top surface and bottom surface, and an outer perimeter defined by a forward nose portion, a leftside, rightside and aft side;

an inner floor structure adapted to be installed over the hull;

a body having an outside surface, inside surface, forward body portion, aft body portion, left body side, right body side and roof portion, the body adapted to be attached to at least one of the top surface of the hull and the inner floor structure, such that a interior compartment is formed thereinside;

a tail wing assembly adapted to be attached to the aft end of the body;

a forward nose cowl adapted to be attached to at least one of the forward nose portion of the hull and the forward body portion of the body;

a windshield integrated into the forward end of the body;

at least one door assembly integrated into the left or right body side;

at least one window assembly integrated into the left or right body side;

a propulsion system integrated within the aft end of the body; and a skirt attached and draped from the outer perimeter of the hull; and a hatch disposed through the roof portion of the body.

\* \* \* \* \*